United States Patent [19]

Wolfrum et al.

[11] 4,059,402

[45] Nov. 22, 1977

[54] TRANSFER PRINTING PROCESS

[75] Inventors: Gerhard Wolfrum, Bergisch-Neukirchen; Werner Kühnel, Leverkusen; Erich Klauke, Odenthal-Hahnenberg; Gerhard Büttner, Cologne, all of Germany

[73] Assignee: Bayer Aktiengesellschaft, Leverkusen, Germany

[21] Appl. No.: 691,869

[22] Filed: June 1, 1976

Related U.S. Application Data

[63] Continuation of Ser. No. 533,307, Dec. 16, 1974, abandoned.

[30] Foreign Application Priority Data

Dec. 24, 1973 Germany ............................ 2364475

[51] Int. Cl.$^2$ ............................ D06P 5/20; D06P 5/17
[52] U.S. Cl. ............................ 8/2.5 A; 8/2.5 R; 8/41 R; 8/41 B; 8/41 C; 106/22; 260/205
[58] Field of Search ............................ 8/2.5 A, 2.5 R; 260/205

[56] References Cited

U.S. PATENT DOCUMENTS

| 3,530,111 | 9/1970 | Angliken ............................ 260/206 |
| 3,782,896 | 1/1974 | Defago et al. ............................ 8/2.5 |

Primary Examiner—Stanford M. Levin
Attorney, Agent, or Firm—Plumley and Tyner

[57] ABSTRACT

The invention relates to the transfer printing hydrophobic fibre materials using paper supports which are printed with azo dyestuffs of the formula

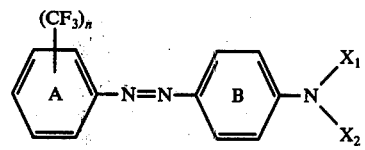

wherein
$X_1$ and $X_2$ represent hydrogen or alkyl or cycloalkyl radicals and
$n$ represents 1–3, and wherein the benzene ring A can obtain non-ionic substituents and the benzene ring B can contain customary non-polar substituents.

8 Claims, No Drawings

TRANSFER PRINTING PROCESS

This is a continuation, of application Ser. No. 533,307 filed Dec. 16, 1974, now abandoned.

The present invention relates to a process for printing hydrophobic fibre materials in accordance with the transfer printing principle, which is characterised in that sublimable azo dyestuffs which are free from sulpho groups, of the formula

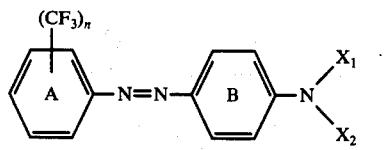

are used,
wherein
$X_1$ and $X_2$ represent hydrogen or alkyl or cycloalkyl radicals which are optionally substituted by nonpolar substituents and
$n$ represents 1–3,
and the benzene ring A can contain non-ionic substituents which are customary in dyestuff chemistry, and the benzene ring P can contain customary non-polar substituents, which do not significantly influence the sublimability of the base molecule. In addition to hydrogen, suitable radicals $X_1$ and $X_2$ are $C_1$–$C_4$-alkyl or $C_5$–$C_7$-cycloalkyl radicals which are optionally substituted by $C_1$–$C_2$-alkoxy, halogen or phenyl.

Suitable non-ionic substituents, customary in dyestuff chemistry, in A are $NO_2$, CN, halogen, $SO_2CH_3$, $SO_2C_2H_5$, $C_1$–$C_4$-alkyl or $C_1$–$C_4$-alkoxy.

Suitable non-polar substituents in B are $C_1$–$C_4$-alkyl, $C_1$–$C_4$-alkoxy, halogen, benzyloxy, phenoxy, optionally halogen-substituted $C_1$–$C_4$-alkylcarbonylamino or formylamino. "Halogen" preferably represents F, Cl and Br. Dyestuffs to be used preferentially correspond to the formula

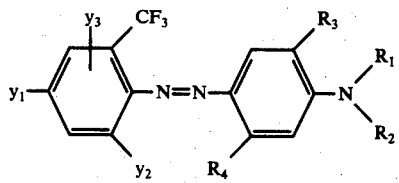

wherein
$y_1$ = H, $NO_2$, CN, $CF_3$ or $CH_3$,
$y_2$ = $y_1$, Cl or Br,
$y_3$ = H or Cl,
$R_1$ and $R_2$ = H, $C_1$–$C_4$-alkyl, phenyl-$C_1$–$C_3$-alkyl, cyclopentyl, cyclohexyl, methylcyclohexyl, $C_1$–$C_4$-chloroalkyl or $C_1$–$C_2$-alkoxy-$C_1$–$C_4$-alkyl,
$R_3$ = H, $C_1$–$C_4$-alkyl, $C_1$–$C_4$-alkoxy, phenoxy or benzyloxy,
$R_4$ = H, $CH_3$, $CF_3$, $C_2H_5$, Cl, Br or $NHCOR_5$ and
$R_5$ = H, $C_1$–$C_4$-alkyl, $C_1$–$C_4$-chloroalkyl, $C_1$–$C_4$-bromoalkyl or methoxy-$C_2$–$C_4$-alkyl.

Preferred types are those, within the scope of the formula II, wherein
a. $y_1$ = $NO_2$ and $y_2$ and $y_3$ = H,
b. $y_1$ and $y_2$ = $NO_2$ and $y_3$ = H,
c. $y_1$ = CN, $y_2$ = $NO_2$ and $y_3$ = H,
d. $y_1$ and $y_3$ = H and $y_2$ = $CF_3$, as well as
e. $y_1$ = $NO_2$; $y_2$ = $CF_3$ and $y_3$ = H
wherein
$R_1$–$R_4$ have the indicated meaning.
Amongst these, in turn, preferred dyestuffs are those in which
$R_3$ = H, $CH_3$, $OCH_3$ or $OC_2H_5$ and
$R_4$ = H, $CH_3$, $C_2H_5$ or Cl.

The dyestuffs of the formula (I) are prepared according to processes which are in themselves known, by diazotising an aniline of the formula (III)

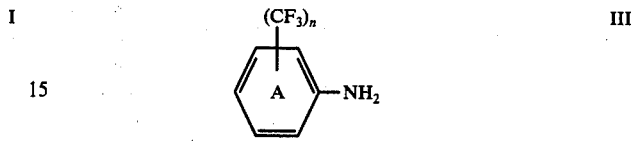

and combining the diazonium compound with a coupling component of the formula (IV).

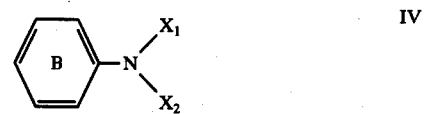

Examples of possible diazo components of the formula (III) are: 1-amino-2-trifluoromethylbenzene, 1-amino-4-trifluoromethylbenzene, 1-amino-2-chloro-4-trifluoromethylbenzene, 1-amino-2-bromo-4-trifluoromethylbenzene, 1-amino-2-methyl-4-trifluoromethylbenzene, 1-amino-2-trifluoromethyl-4-chlorobenzene, 1-amino-2-trifluoromethyl-4-methylbenzene, 1-amino-2,4-bis-trifluoromethylbenzene, 1-amino-2,6-bis-trifluoromethylbenzene, 1-amino-2-chloro-5-trifluoromethylbenzene, 1-amino-2,5-bis-trifluoromethylbenzene, 1-amino-2,4,6-tristrifluoromethylbenzene, 1-amino-2-trifluoromethyl-4-nitrobenzene, 1-amino-2-nitro-4-trifluoromethylbenzene, 1-amino-2-trifluoromethyl-4,6-dinitrobenzene, 1-amino-2,-bis-trifluoromethyl-6-nitrobenzene, 1-amino-2,6-bis-trifluoromethyl-4-nitrobenzene, 1-amino-4-trifluoromethyl-2,6-dinitrobenzene, 1-amino-2-cyano-4-trifluoromethylbenzene, 1-amino-2-trifluoromethyl-4-cyanobenzene, 1-amino-4-trifluoromethyl-2,6-dicyanobenzene, 1-amino-2-trifluoromethyl-4,6-dicyanobenzene, 1-amino-2,6-trifluoromethyl-4-cyanobenzene, 1-amino-4-trifluoromethyl-2-nitro-6-cyanobenzene, 1-amino-2-trifluoromethyl-4-cyano-6-nitrobenzene, 1-amino-2-chloro-4,6-bis-trifluoromethylbenzene, 1-amino-2-fluoro-4-trifluoromethylbenzene, 1-amino-2-fluoro-4,6-bis-trifluoromethylbenzene, 1-amino-2,6-dichloro-4-trifluoromethylaniline, 1-amino-2-trifluoromethyl-5-nitrobenzene, 1-(N,N-diethylamino)-3-trifluoromethylbenzene, 1-(N-ethyl-N-benzylamino)-3-trifluoromethylbenzene, 1-amino-2-trifluoromethyl-4-methylsulphonylbenzene, 1-amino-2-trifluoromethyl-4-ethylsulphonylbenzene, 1-amino-2,6-bis-trifluoromethyl-4-nitrobenzene and 1-amino-2-methoxy-4-nitro-6-trifluoromethylbenzene.

Examples of possible coupling components of the formula (IV) are: N,N-dimethylaniline, N,N-diethylaniline, N,N-di-n-propylaniline, N,N-diisopropylaniline, N,N-di-n-butylaniline, N-methyl-N-benzylaniline, N-ethyl-N-benzylaniline, N-n-propyl-N-benzylaniline, N-methyl-N-β-phenylethylaniline, N-ethyl-N-β-phenylethylaniline, N-n-butyl-N-β-phenylethylaniline, N-methyl-N-cyclopentylaniline, N-ethyl-N-cyclopentylaniline, N-methyl-N-cyclohexylaniline, N-ethyl-N-cyclohexylaniline, N,n-butyl-N-cyclohexylaniline, N,N-di-benzylaniline, N-benzyl-N-cyclohexylaniline, N-β-phenethyl-N-cyclohexylaniline, N-methyl-N-β-chloroethylaniline, N-ethyl-N-β-chloroethylaniline, N-methyl-N-β-chloropropylaniline, N-ethyl-N-β-chloropropylaniline, N-ethyl-N-γ-chloropropylaniline, N-ethyl-N-β-bromoethylaniline, N-n-propyl-N-β-chloroethylaniline, N-propyl-N-γ-chloroethylaniline, N-benzyl-N-β-chloroethylaniline, N-cyclohexyl-N-β-chloroethylaniline, N,N-bis-β-chloroethylaniline, N-β-phenylethyl-N-β-chloroethylaniline, 1-(N,N-dimethylamino)-3-methylbenzene, 1-(N,N-diethylamino)-3-methylbenzene, 1-(N,N-di-n-propylamino)-3-methylbenzene, 1-(N,N-diisopropylamino)-3-methylbenzene, 1-(N,N-di-n-butylamino)-3-methylbenzene, 1-(N-methyl-N-benzylamino)-3-methylbenzene 1-(N-ethyl-N-benzylamino)-3-methylbenzene, 1-(N-n-propyl-N-benzylamino)-3-methylbenzene, 1-(N-methyl-N-β-phenylethylamino)-3-methylbenzene, 1-(N-ethyl-N-β-phenylethylamino)-3-methylbenzene, 1-(N,n-butyl-N-β-phenylethylamino)-3-methylbenzene, 1-(N-methyl-N-cyclopentylamino)-3-methylbenzene, 1-(N-ethyl-N-cyclopentylamino)-3-methylbenzene, 1-(N-methyl-N-cyclohexylamino)-3-methylbenzene, 1-(N-ethyl-N-cyclohexylamino)-3-methylbenzene, 1-(N,N-dibenzylamino)-3-methylbenzene, 1-(N-benzyl-N-cyclohexylamino)-3-methylbenzene, 1-(N-methyl-N-β-chloroethylamino)-3-methylbenzene, 1-(N-ethyl-N-β-chloroethylamino)-3-methylbenzene, 1-(N-methyl-N-β-chloropropylamino)-3-methylbenzene, 1-(N-ethyl-N-β-chloropropylamino)-3-methylbenzene, 1-(N-ethyl-N-γ-chloropropylamino)-3-methylbenzene, 1-(N-ethyl-N-β-bromoethylamino)--methylbenzene, 1-(N-benzyl-N-β-chloroethylamino)-3-methylbenzene, 1-(N-cyclohexyl-N-β-chloroethylamino)-3-methylbenzene, 1-(N-β-phenylethyl-N-β-chloroethylamino)-3-methylbenzene, 1-(N,N-bis-β-chloroethylamino-3-methylbenzene, 1-(N,N-dimethylamino)-3-chlorobenzene, 1-(N,N-diethylamino)-3-chlorobenzene, 1-(N-ethyl-N-benzylamino)-3-chlorobenzene, 1-(N-ethyl-N-β-phenylethylamino)-3-chlorobenzene, 1-(N-ethyl-N-cyclohexylamino)-3-chlorobenzene, 1-(N-ethyl-N-β-chloroethylamino)-3-chlorobenzene, 1-(N,N-diethylamino)-3-bromobenzene, 1-(N-ethyl-N-benzylamino)-3-bromobenzene, 1-(N-ethyl-N-β-chloroethylamino)-3-bromobenzene, 1-(N,N-dimethylamino)-3-acetylaminobenzene, 1-(N,N-dimethylamino)-3-propionylaminobenzene, 1-(N,N-dimethylamino)-B 3-formylaminobenzene, 1-(N,N-dimethylamino)-3-chloroacetylaminobenzene, 1-(N,N-dimethylamino)-3-β-chloropropionylaminobenzene, 1-(N,N-diethylamino-3-formylaminobenzene, 1-(N,N-diethylamino)-3-acetylaminobenzene, 1-(N,N-diethylamino)-3-butyrylaminobenzene, 1-(N,N-diethylamino)-3-chloroacetylaminobenzene, 1-(N,N-ethylbenzylamino)-3-acetylaminobenzene, 1-(N-ethyl-N-benzylamino)-3-chloroacetylaminobenzene, 1-(N-ethyl-N-benzylamino)-3-formylaminobenzene, 1-(N,N-dibutylamino)-3-formylaminobenzene, 1-(N,N-dibutylamino)-3-chloroacetylaminobenzene, 1-(N,N-dimethylamino)-2-methoxy-5-formylaminobenzene, 1-(N,N-dimethylamino)-2-methoxy-5-acetylaminobenzene, 1-(N,N-diethylamino)-2-methoxy-5-acetylaminobenzene, 1-(N,N-diethylamino)-2-ethoxy-5-acetylaminobenzene, 1-(N,N-diethylamino)-2-phenoxy-5-acetylaminobenzene, 1-(N,N-diethylamino)-2-benzyloxy-5-acetylaminobenzene, 1-(N,N-diethylamino)-2-methyl-5-acetylaminobenzene, 1-(N,N-diethylamino)-2-methyl-5-chlorobenzene, 1-(N,N-diethylamino)-2,5-dimethylbenzene, 1-(N,N-diethylamino)-2-ethyl-5-formylaminobenzene, 1-(N,N-diethylamino)-2-propoxy-5-acetylaminobenzene, 1-(N,N-diethylamino)-2-methoxy-5-chloroacetylaminobenzene, 1-(N-ethyl-N-benzylamino)-2-methoxy-5-acetylaminobenzene, 1-(N-ethyl-N-cyclohexylamino)-2-methoxy-5-acetylaminobenzene, 1-(N-ethyl-N-β-chloroethylamino)-2-methoxy-5-acetylaminobenzene, 1-(N,N-ethylamino)-2-methoxy-5-methylbenzene, 1-(N,N-diethylamino)-2-methoxy-5-chlorobenzene, 1-(N-benzyl-N-n-butylamino)-2-methoxy-5-acetylaminobenzene and 1-(N,N-dibenzylamino)-2-phenoxy-5-chloroacetylaminobenzene.

The transfer printing process is generally known and has been described, for example, in French Patent Specifications 1,223,330 and 1,334,829. The dyestuffs, for example in the form of so-called printing inks, such as are described, for example, in French Patent Specification 1,573,698, or in the form of pastes, are applied to temporary supports (paper, other cellulosic materials, such as cotton or cellophane, metal foils and the like, such as are known, for example, from French Patent Specification 1,575,069). These printing inks are dyestuff solutions, also containing synthetic resin, in suitable organic solvents, such as benzene, toluene, xylene, chlorobenzene, chloroform, dichloroethane, trichloroethylene, perchloroethylene, ethanol, iso-propanol, benzyl alcohol, cyclohexanone, ethyl acetate or their mixtures. However, the printing inks and printing pastes can also be formulated on an aqueous basis and are thus dispersions of the dyestuffs in water, which in addition contain customary dispersing agents and thickeners (compare French Patent Specification 1,223,330) and U.S. Patent Specification 3,647,503). The printing inks can be printed by the customary printing processes (relief printing, gravure printing, offset printing, film printing or screen printing).

Suitable substrates for transfer printing with dyestuffs of the formula I are textile materials which consist wholly or predominantly of polyesters, such as polyethylene glycol terephthalate, poly-1,4-bis-hydroxymethylcyclohexane terephthalate or cellulose triacetate and cellulose 2½-acetate or of polyamides or polyacrylonitrile, but also non-textile plastics articles, such as films, tapes or blocks of commercially available polymerisation or polycondensation plastics.

Particularly suitable dyestuffs I sublime in the range from 140°–250° C, preferably from 160°–220° C.

EXAMPLE 1

A. 75 g of the dyestuff of the formula

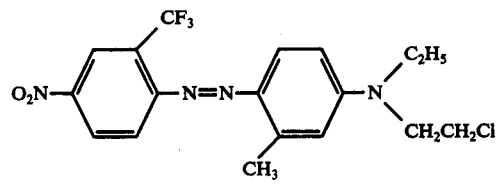

50 g of an anionic dispersing agent, for example a ligninsulfonate or a condensation product of naphthalenesulphonic acid and formaldehyde, and 100 ml of water are mixed and converted to a finely divided form by grinding for 10 hours in a ball mill.

The dispersion thus obtained, which contains approx. 30% of crude colourant, is stable on storage.

B. The aqueous dispersion obtained according to A) can be converted to a printing paste as follows: 50 to 200 g are worked into a paste with 400 g of a 10% strength carob bean flour ether thickener and 550 to 400 ml of water.

C. A paper is printed with this printing paste by the gravure printing process. If this paper is pressed against a textile of polyester fibres for 15 to 60 seconds at 200° C, a clear, deep red print with good fastness properties is obtained.

EXAMPLE 2

A. 40 to 50 g of the dyestuff used in Example 1 are worked into a paste with 5 to 10 g of an emulsifier mixture of ethoxylated nonylphenol (4 to 12 mols of ethylene oxide) in water. 10 g of ethylcellulose N4 (Hercules Powder) and 30 to 40 parts of a maleate resin which has been prepared by condensation of colophony with maleic acid are added. The mixture is kneaded at 80° to 100° C for approx. 2 hours and is then ground on one of the customary mills. A finely granular dyestuff powder is obtained.

200 g of the dyestuff powder obtained according to A) are introduced into a mixture of 730 g of ethanol, 50 g of ethylene glycol and 20 g of ethylcellulose N22 (Hercules Powder), whilst stirring.

C. Papers can be printed with the printing ink thus obtained by the gravure printing process. Textiles of cellulose triacetate or polyamide, for example knitted fabrics, can be printed with these printed papers by the transfer process, and deep red prints are obtained.

The dyestuff of Example 1 was prepared as follows: 60 parts of finely powdered 1-amino-2-trifluoromethyl-4-nitrobenzene were dissolved in 300 parts of concentrated sulphuric acid whilst stirring; during this time the temperature should not exceed 20° C. The solution is then cooled to 0° C and nitrosylsulphuric acid prepared by dissolving 20 parts of sodium nitrite in 80 parts of concentrated sulphuric acid is gradually added dropwise at the same temperature. The mixture is stirred for approx. 2 hours longer at 0° C. The diazonium salt solution thus prepared is now added gradually at 0°-5° C, whilst stirring well, to a solution of 58 parts of 1-(N-ethyl-N-$\beta$-chloroethylamino)-3-methylbenzene in 2,000 parts of water and 50 parts of concentrated hydrochloric acid, to which 10 parts of amidosulphonic acid have been added. The coupling reaction starts immediately. It can be accelerated by buffering with a solution to pH 4–5 by means of sodium acetate. After completion of coupling, the azo dyestuff formed is filtered off, washed with water until free of salt and dried. 116 parts of a red dyestuff powder are obtained.

The table which follows lists further dyestuffs which are obtained when the diazo component of column 2 is diazotised and combined with the coupling component of column 3 to give the azo dyestuff, and also lists the shades obtainable therewith in accordance with the process indicated in Example 1.

| Example No. | Diazo component | Coupling component | Shade on polyester |
|---|---|---|---|
| 3 | 2-CF$_3$, 4-O$_2$N, 1-NH$_2$ benzene | C$_6$H$_5$—N(CH$_3$)$_2$ | red |
| 4 | " | C$_6$H$_5$—N(C$_2$H$_5$)$_2$ | " |
| 5 | " | C$_6$H$_5$—N(C$_2$H$_5$)(CH$_2$—C$_6$H$_5$) | " |
| 6 | " | C$_6$H$_5$—N(C$_2$H$_5$)(CH$_2$CH$_2$—C$_6$H$_5$) | " |
| 7 | " | C$_6$H$_5$—N(C$_2$H$_5$)(C$_6$H$_{11}$) | " |
| 8 | " | C$_6$H$_5$—N(C$_3$H$_7$)$_2$ | |

-continued

| Example No. | Diazo component | Coupling component | Shade on polyester |
|---|---|---|---|
| 9 | " | ⌬—N(n-C₄H₉)₂ | " |
| 10 | " | Ph-N(n-C₄H₉)(CH₂Ph) | " |
| 11 | " | Ph-N(CH₃)(CH₂CH₂Cl) | scarlet |
| 12 | " | Ph-N(C₂H₅)(CH₂CH₂Cl) | " |
| 13 | " | Ph-N(C₂H₅)(CH₂—CH(Cl)—CH₃) | " |
| 14 | " | Ph-N(C₂H₅)(CH₂—CH₂—CH₂Cl) | " |
| 15 | " | Ph-N(C₂H₅)(CH₂CH₂Br) | " |
| 16 | " | Ph-N(CH(CH₃)₂)(C₂H₅) | red |
| 17 | " | Ph-N(C₂H₅)(CH₂—C₆H₄—Cl) | " |
| 18 | " | Ph-N(CH₃)(CH₂—C₆H₄—CH₃) | " |
| 19 | " | Ph-N(C₂H₅)(CH₂CH₂OCH₃) | " |
| 20 | " | Ph-N(C₂H₅)(CH₂CH₂OC₂H₅) | " |

-continued
| Example No. | Diazo component | Coupling component | Shade on polyester |
|---|---|---|---|
| 21 | " | 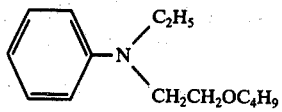 | " |
| 22 | " | 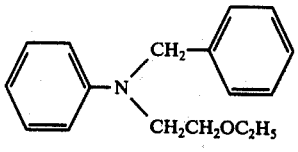 | " |
| 23 | " | 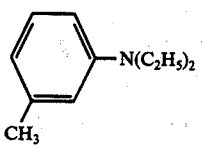 | bluish-tinged red |
| 24 | " | 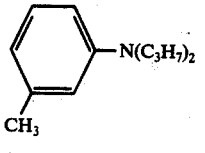 | " |
| 25 | " | 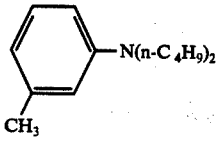 | " |
| 26 | " | 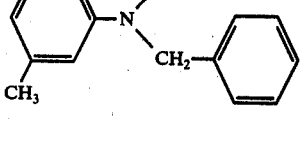 | " |
| 27 | " | 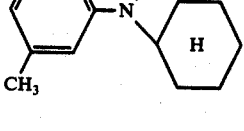 | " |
| 28 | " | 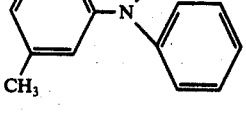 | " |
| 29 | " | 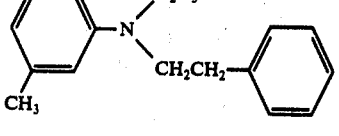 | " |
| 30 | " | 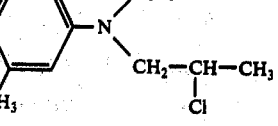 | red |

-continued
| Example No. | Diazo component | Coupling component | Shade on polyester |
|---|---|---|---|
| 31 | " | 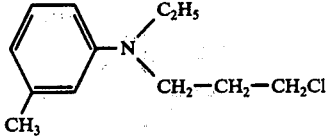 | " |
| 32 | " | 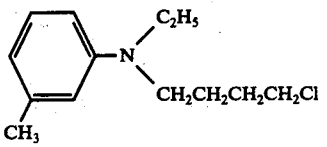 | " |
| 33 | " | 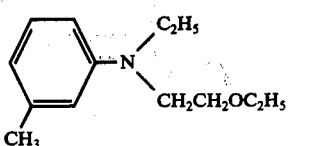 | bluish-tinged red |
| 34 | " | 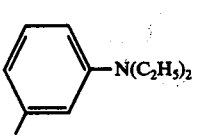 | " |
| 35 | " | 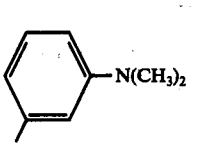 | red |
| 36 | " | 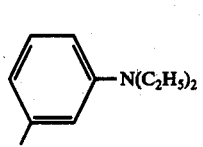 | " |
| 37 | " | 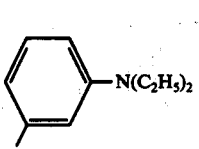 | " |
| 38 | " | 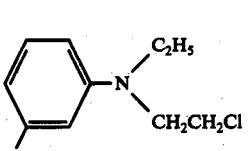 | yellowish-tinged red |
| 39 | " | 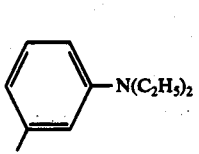 | " |
| 40 | " | 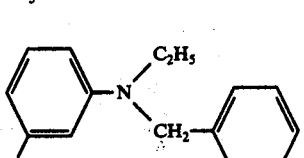 | " |

-continued
| Example No. | Diazo component | Coupling component | Shade on polyester |
|---|---|---|---|
| 41 | " | 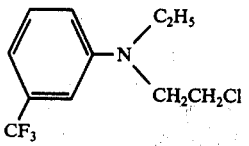 | " |
| 42 | " | 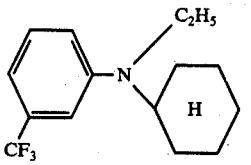 | " |
| 43 | " | 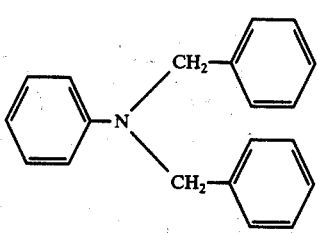 | " |
| 44 | " | 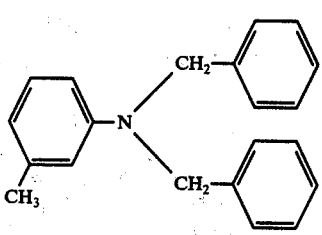 | red |
| 45 | " | 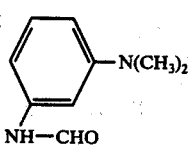 | bluish-tinged red |
| 46 | " | 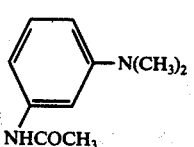 | " |
| 47 | " | 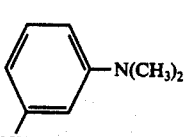 | " |
| 48 | " | 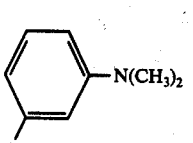 | " |
| 49 | " | 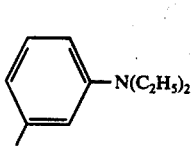 | " |

-continued

| Example No. | Diazo component | Coupling component | Shade on polyester |
|---|---|---|---|
| 50 | " | 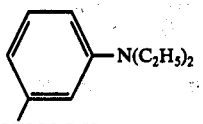 NHCOC$_4$H$_9$, N(C$_2$H$_5$)$_2$ | " |
| 51 | " | 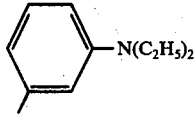 NHCOCH$_2$Cl, N(C$_2$H$_5$)$_2$ | " |
| 52 | " | 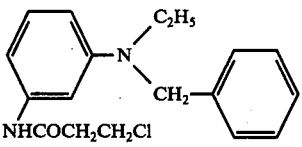 NHCOCH$_2$CH$_2$Cl, N(C$_2$H$_5$)(CH$_2$C$_6$H$_5$) | " |
| 53 | " | 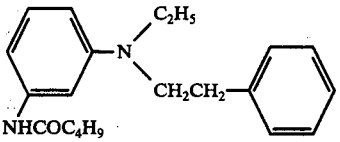 NHCOC$_4$H$_9$, N(C$_2$H$_5$)(CH$_2$CH$_2$C$_6$H$_5$) | " |
| 54 | " | 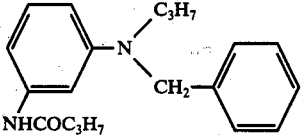 NHCOC$_3$H$_7$, N(C$_3$H$_7$)(CH$_2$C$_6$H$_5$) | " |
| 55 | " | 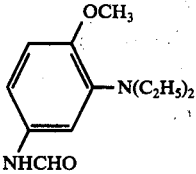 OCH$_3$, N(C$_2$H$_5$)$_2$, NHCHO | red-violet |
| 56 | " | 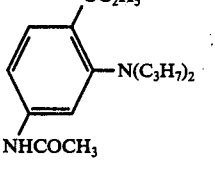 OC$_2$H$_5$, N(C$_3$H$_7$)$_2$, NHCOCH$_3$ | " |
| 57 | " | 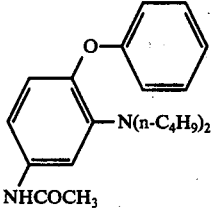 O-C$_6$H$_5$, N(n-C$_4$H$_9$)$_2$, NHCOCH$_3$ | " |
| 58 | " | 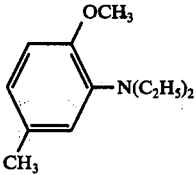 OCH$_3$, N(C$_2$H$_5$)$_2$, CH$_3$ | claret |

-continued

| Example No. | Diazo component | Coupling component | Shade on polyester |
|---|---|---|---|
| 59 | " | 4-OCH₃, 2-N(C₂H₅)₂, 5-Cl benzene | " |
| 60 | " | C₆H₅-N(CH₂CH₂Cl)₂ | scarlet |
| 61 | " | 3-CH₃-C₆H₄-N(CH₂CH₂Cl)₂ | yellowish-tinged red |
| 62 | " | 2-OCH₃, 5-CH₃-C₆H₃-N(CH₂CH₂Cl)₂ | red |
| 63 | " | 4-OCH₃, 3-N(CH₂CH₂Cl)₂, NHCOCH₃ benzene | claret |
| 64 | " | 4-OCH₃, 3-N(C₂H₅)(CH₂C₆H₅), NHCOCH₃ benzene | red-violet |
| 65 | " | 4-OC₂H₅, 3-N(C₂H₅)(CH₂CH₂C₆H₅), NHCOC₃H₇ benzene | " |
| 66 | 2-NH₂, 1-CF₃, 3-NO₂, 5-NO₂ benzene | C₆H₅-N(CH₃)₂ | violet |
| 67 | " | C₆H₅-N(C₂H₅)₂ | " |
| 68 | " | C₆H₅-N(n-C₄H₉)₂ | " |

-continued

| Example No. | Diazo component | Coupling component | Shade on polyester |
|---|---|---|---|
| 69 | " | C₆H₅–N(C₂H₅)(CH₂–C₆H₅) | " |
| 70 | " | C₆H₅–N(C₂H₅)(CH₂CH₂Cl) | claret |
| 71 | " | C₆H₅–N(C₂H₅)(CH₂CH₂CH₂Cl) | " |
| 72 | " | C₆H₅–N(C₂H₅)(CH₂–CHCl–CH₃) | " |
| 73 | " | C₆H₅–N(CH₂–C₆H₅)(CH₂CH₂Cl) | " |
| 74 | " | 3-CH₃–C₆H₄–N(C₂H₅)(CH₂–C₆H₅) | reddish-tinged blue |
| 75 | " | 3-CH₃–C₆H₄–N(C₂H₅)₂ | " |
| 76 | " | 3-CH₃–C₆H₄–N(CH₂CH₂Cl)₂ | blue-violet |
| 77 | " | 3-CH₃–C₆H₄–N(C₂H₅)(CH₂CH₂Cl) | " |
| 78 | " | 3-CH₃–C₆H₄–N(C₂H₅)(C₆H₅) | reddish-tinged blue |
| 79 | " | 3-Cl–C₆H₄–N(C₂H₅)₂ | red |

-continued
| Example No. | Diazo component | Coupling component | Shade on polyester |
|---|---|---|---|
| 80 | " | 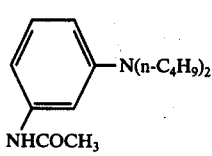 | reddish-tinged blue |
| 81 | " | 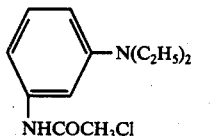 | " |
| 82 | " | 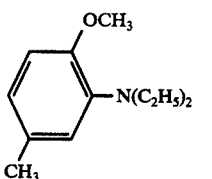 | blue-violet |
| 83 | " | 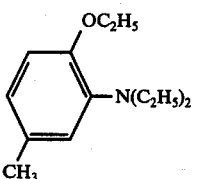 | " |
| 84 | " | 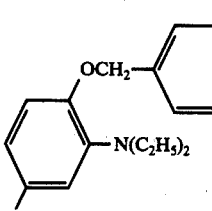 | " |
| 85 | " | 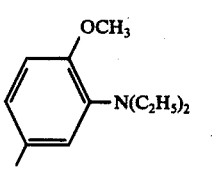 | blue |
| 86 | " | 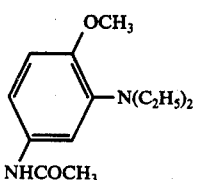 | " |
| 87 | " | 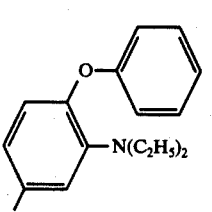 | " |

4,059,402
-continued
| Example No. | Diazo component | Coupling component | Shade on polyester |
|---|---|---|---|
| 88 | | 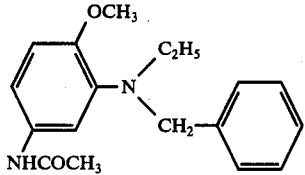 | " |
| 89 | | 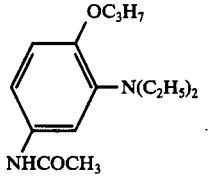 | " |
| 90 | 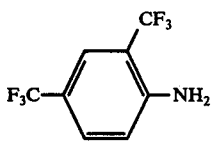 | 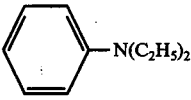 | yellowish-tinged orange |
| 91 | " | 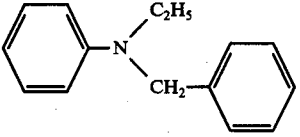 | " |
| 92 | " | 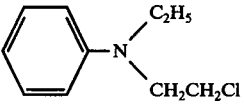 | " |
| 93 | " | 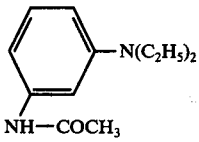 | reddish-tinged orange |
| 94 | " | 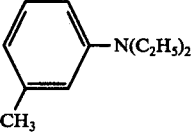 | orange |
| 95 | " | 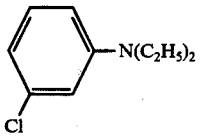 | " |
| 96 | " | 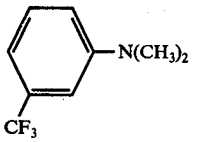 | " |
| 97 | " | 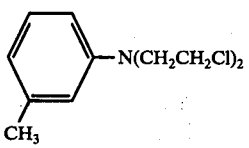 | " |

-continued
| Example No. | Diazo component | Coupling component | Shade on polyester |
|---|---|---|---|
| 98 | " | 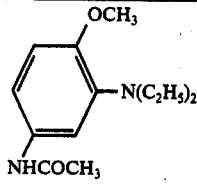 | red |
| 99 | " | 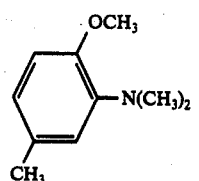 | " |
| 100 | " | 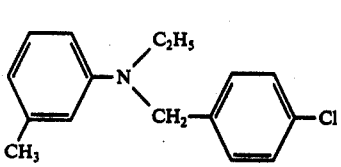 | orange |
| 101 | " | 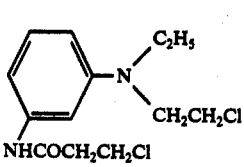 | " |
| 102 | 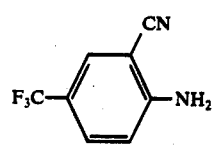 | 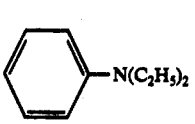 | " |
| 103 | " | 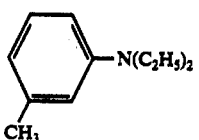 | reddish-tinged orange |
| 104 | " | 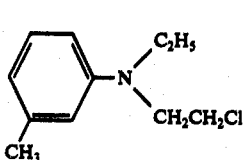 | " |
| 105 | " | 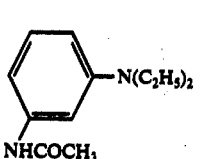 | yellowish-tinged red |
| 106 | " | 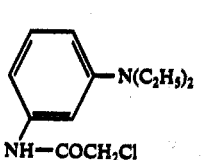 | " |
| 107 | " | 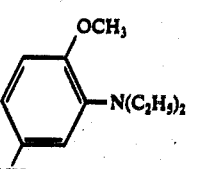 | red |

-continued
| Example No. | Diazo component | Coupling component | Shade on polyester |
|---|---|---|---|
| 108 | " | 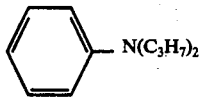 | orange |
| 109 | " | 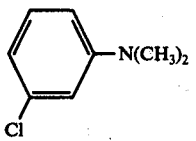 | " |
| 110 | 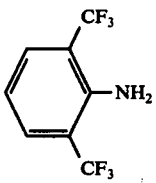 | 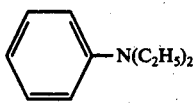 | reddish-tinged yellow |
| 111 | " | 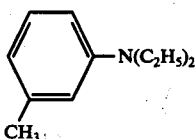 | yellowish-tinged orange |
| 112 | " | 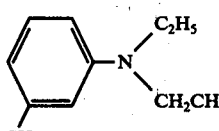 | " |
| 113 | " | 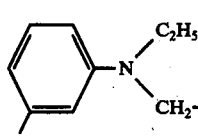 | orange |
| 114 | " | 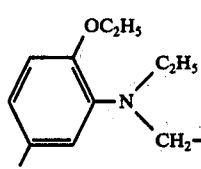 | red |
| 115 | 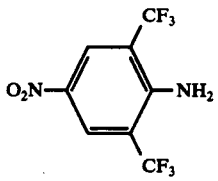 | 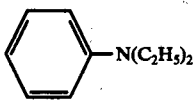 | brick-red |
| 116 | " | 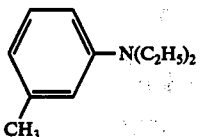 | reddish-tinged brown |
| 117 | " | 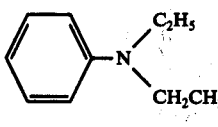 | yellowish-tinged brick-red |

| Example No. | Diazo component | Coupling component | Shade on polyester |
|---|---|---|---|
| 118 | " | 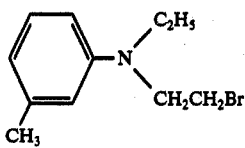 | reddish-tinged brown |
| 119 | " | 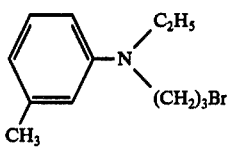 | " |
| 120 | " | 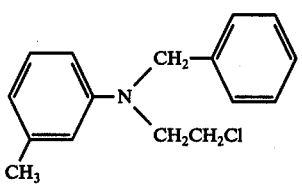 | " |
| 121 | " | 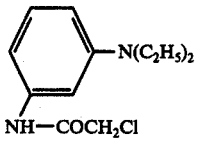 | red-brown |
| 122 | 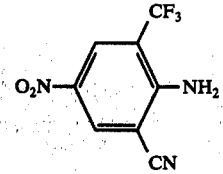 | 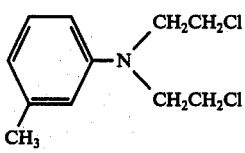 | violet |
| 123 | 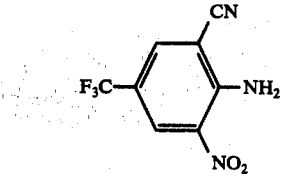 | 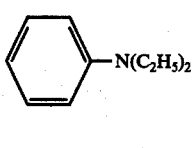 | bluish-tinged claret |
| 124 | " | 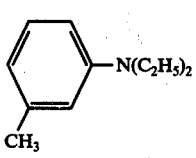 | reddish-tinged violet |
| 125 | " | 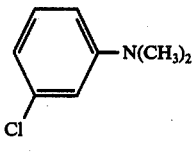 | claret |
| 126 | " | 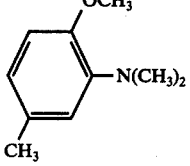 | violet |
| 127 | " | 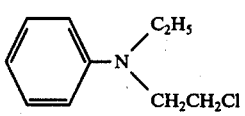 | bluish-tinged claret |

-continued

| Example No. | Diazo component | Coupling component | Shade on polyester |
|---|---|---|---|
| 128 | " | 3-CH₃, N(C₂H₅)(CH₂CH₂Cl)-phenyl | red-violet |
| 129 | " | 2-NHCOCH₃, 5-N(C₂H₅)₂-phenyl | violet |
| 130 | " | 4-OCH₃, 2-N(C₂H₅)₂, 5-NHCOCH₃-phenyl | blue-violet |
| 131 | 2-Cl, 4-CF₃-aniline | 3-CH₃, N(C₂H₅)₂-phenyl | reddish-tinged yellow |
| 132 | " | 3-Cl, N(C₂H₅)(CH₂CH₂Cl)-phenyl | " |
| 133 | 2,5-Cl₂, 4-CF₃-aniline | N(C₄H₉)₂-phenyl | " |
| 134 | " | N(C₂H₅)(CH₂C₆H₅)-phenyl | " |
| 135 | " | 3-NHCOCH₂Cl, N(C₂H₅)₂-phenyl | orange |
| 136 | 2,5-(CF₃)₂-aniline | N(C₂H₅)₂-phenyl | reddish-tinged yellow |
| 137 | " | 3-CH₃, N(C₂H₅)₂-phenyl | yellowish-tinged orange |

-continued

| Example No. | Diazo component | Coupling component | Shade on polyester |
|---|---|---|---|
| 138 | " | 3-N(CH₃)₂, NH—COCH₃ phenyl | orange |
| 139 | " | 4-OCH₃, 2-N(C₂H₅)₂, 5-CH₃ phenyl | red |
| 140 | " | 4-OCH₃, 2-N(C₂H₅)₂, 5-NHCOCH₃ phenyl | " |
| 141 | 2-Cl, 5-CF₃ aniline | 3-N(C₂H₅)₂, 4-CH₃ phenyl | yellowish-tinged orange |
| 142 | " | 3-N(C₂H₅)₂, 5-NHCOCH₃ phenyl | orange |
| 143 | 2-Br, 5-CF₃ aniline | N(C₂H₅)(CH₂CH₂Cl) phenyl | reddish-tinged yellow |
| 144 | " | N(C₂H₅)(CH₂-phenyl) phenyl | reddish-tinged yellow |
| 145 | " | 3-N(C₂H₅)₂, 4-CH₃ phenyl | yellowish-tinged orange |
| 146 | " | 3-N(CH₃)₂, 5-Cl phenyl | reddish-tinged yellow |
| 147 | 2-F, 4-CF₃ aniline | N(C₂H₅)₂ phenyl | yellow |

-continued

| Example No. | Diazo component | Coupling component | Shade on polyester |
|---|---|---|---|
| 148 | " | C₆H₅—N(CH₂CH₂Cl)₂ | " |
| 149 | " | 3-methyl-C₆H₄—N(C₂H₅)(CH₂CH₂OCH₃) | reddish-tinged yellow |
| 150 | 2-amino-3-chloro-5-nitro-1-(trifluoromethyl)benzene (2-Cl, 4-NO₂, 6-CF₃ aniline) | C₆H₅—N(C₂H₅)₂ | yellowish-tinged brick-red |
| 151 | " | 3-methyl-C₆H₄—N(C₂H₅)₂ | brick-red |
| 152 | " | 3-(NHCHO)-C₆H₄—N(C₂H₅)₂ | red-brown |
| 153 | " | 3-methyl-C₆H₄—N(C₂H₅)(CH₂CH₂Cl) | brick-red |
| 154 | 2-amino-3-bromo-5-nitro-1-(trifluoromethyl)benzene | C₆H₅—N(C₂H₅)₂ | yellowish-tinged brick-red |
| 155 | " | 3-methyl-C₆H₄—N(C₄H₉)₂ | brick-red |
| 156 | 2-amino-1,3,5-tris(trifluoromethyl)benzene | C₆H₅—N(C₂H₅)₂ | orange |
| 157 | " | C₆H₅—N(C₂H₅)(CH₂C₆H₅) | " |

-continued
| Example No. | Diazo component | Coupling component | Shade on polyester |
|---|---|---|---|
| 158 | " | 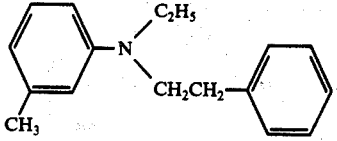 | reddish-tinged orange |
| 159 | 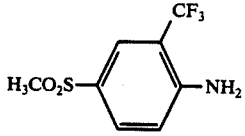 | 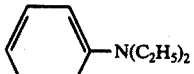 | reddish-tinged yellow |
| 160 | " | 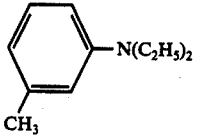 | " |
| 161 | " | 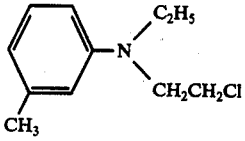 | " |
| 162 | " | 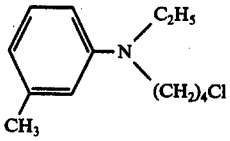 | " |
| 163 | 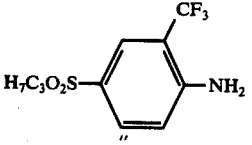 | 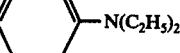 | " |
| 164 | " | 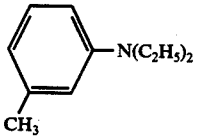 | " |
| 165 | " | 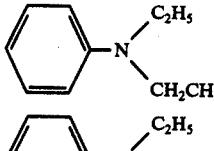 | " |
| 166 | " | 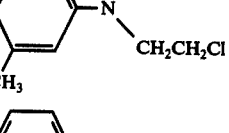 | " |
| 167 | 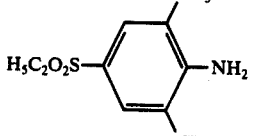 |  | " |
| 168 | " | 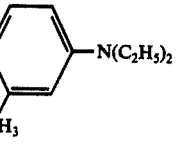 | orange |
| 169 | " | 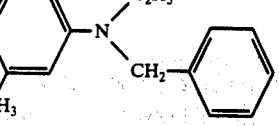 | " |

-continued

| Example No. | Diazo component | Coupling component | Shade on polyester |
|---|---|---|---|
| 170 | " | 3-methyl-N-(2-chloroethyl)-N-benzyl-aniline | " |
| 171 | 4-amino-2,5-bis(trifluoromethyl)-phenyl ethylsulfone (H$_5$C$_2$O$_2$S, CF$_3$, CF$_3$, NH$_2$) | N,N-dimethylaniline | |
| 172 | " | N,N-di-n-butylaniline | " |
| 173 | " | 3-methyl-N,N-diethylaniline | |
| 174 | 4-amino-3-trifluoromethyl-benzonitrile (NC, CF$_3$, NH$_2$) | N,N-diethylaniline | reddish-tinged orange |
| 175 | " | 3-methyl-N,N-diethylaniline | yellowish-tinged red |
| 176 | " | N-ethyl-N-(2-cyanoethyl)-aniline | orange |
| 177 | " | 3-methyl-N-ethyl-N-(2-cyanoethyl)-aniline | " |
| 178 | " | 3-acetamido-N,N-diethylaniline | scarlet |
| 179 | " | 2-methoxy-5-acetamido-N,N-diethylaniline | claret |
| 180 | 4-amino-3-chloro-5-trifluoromethyl-benzonitrile (NC, CF$_3$, NH$_2$, Cl) | N-ethylaniline | orange |

We claim:
1. In a process for printing hydrophobic fiber materials selected from the group consisting of polyesters and polyamides by the sublimation transfer printing process, the improvement which comprises employing sublimable azo dyestuffs which have the formula

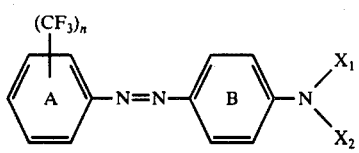

wherein $X_1$ and $X_2$ are hydrogen, $C_1$-$C_4$-alkyl, $C_5$-$C_7$-cycloalkyl, substituted $C_1$-$C_4$-alkyl, or substituted $C_5$-$C_7$-cycloalkyl, wherein the substituents are $C_1$-$C_2$-alkoxy, halogen, or phenyl;

n is a number from 1 to 3;

A is substituted as shown in the above formula or is further substituted by $NO_2$, CN, halogen, $SO_2CH_3$, $SO_2C_2H_5$, $C_1$-$C_4$-alkyl, or $C_1$-$C_4$-alkoxy; and B is as shown in the formula or is further substituted by $C_1$-$C_4$-alkyl, $C_1$-$C_4$-alkoxy, halogen, benzyloxy, phenoxy, $C_1$-$C_4$-alkylcarbonylamino, formylamino, halo, ($C_1$-$C_4$-alkyl) carbonylamino, or haloformylamino.

2. Process of claim 1 wherein $X_1$ and $X_2$ are $C_1$-$C_4$-alkyl, $C_5$-$C_7$-cycloalkyl, or either of these radicals substituted by $C_1$-$C_2$-alkoxy, halogen, or phenyl;

A is as shown in the formula or is substituted by $NO_2$, CN, halogen, $SO_2CH_3$, $SO_2C_2H_5$, $C_1$-$C_4$-alkyl, or $C_1$-$C_4$-alkoxy; and B is as shown in the formula or is substituted by $C_1$-$C_4$-alkyl, $C_1$-$C_4$-alkoxy, halogen, benzyloxy, phenoxy, $C_1$-$C_4$-alkylcarbonylamino, halo ($C_1$-$C_4$-alkyl)-carbonylamino, formylamino, or haloformylamino.

3. Process of claim 1 wherein the dyestuff has characterized in that the formula

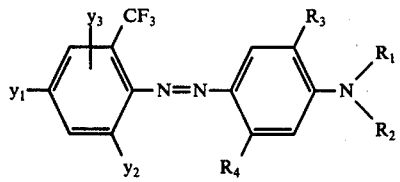

wherein $Y_1$ is H, $NO_2$, CN, $CF_3$, or $CH_3$;

$Y_2$ is H, $NO_2$, CN, $CF_3$, $CH_3$, Cl, or Br;

$Y_3$ is H or Cl;

$R_1$ and $R_2$ are H, $C_1$-$C_4$-alkyl, phenyl-$C_1$-$C_3$-alkyl, cyclopentyl, cyclohexyl, methylcyclohexyl, $C_1$-$C_4$-chloroalkyl or $C_1$-$C_2$-alkoxy-$C_1$-$C_4$-alkyl;

$R_3$ is H, $C_1$-$C_4$-alkyl, $C_1$-$C_4$-alkoxy, phenoxy, or benzyloxy;

$R_4$ is H, $CH_3$, $CF_3$, $C_2H_5$, Cl, Br or $NHCOR_5$; and $R_5$ is H, $C_1$-$C_4$-alkyl, $C_1$-$C_4$-chloroalkyl, $C_1$-$C_4$-bromoalkyl, or methoxy-$C_2$-$C_4$-alkyl.

4. Process according to claim 1, characterised in that a dyestuff of the formula

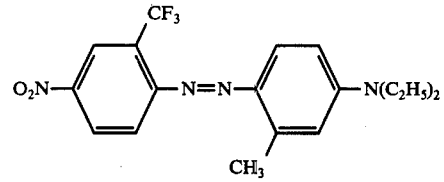

is used.

5. Process according to claim 1, characterised in that a dyestuff of the formula

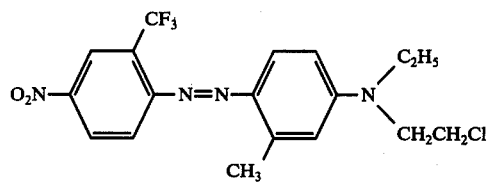

is used.

6. Process according to claim 1 characterised in that a dyestuff of the formula

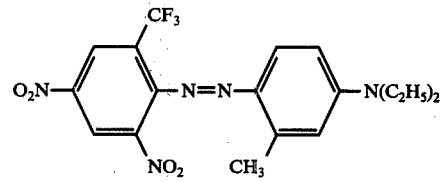

is used.

7. Process according to claim 1, characterised in that a dyestuff of the formula

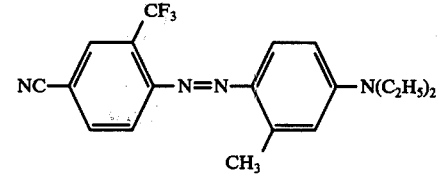

is used.

8. Process according to claim 1, characterised in that a dyestuff of the formula

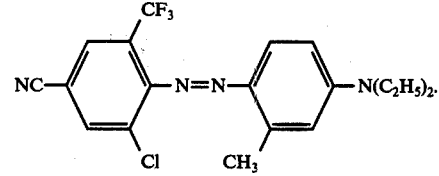

* * * * *